United States Patent
Bruckner et al.

(10) Patent No.: US 10,182,001 B2
(45) Date of Patent: Jan. 15, 2019

(54) METHOD FOR CROSS-TRAFFICKING BETWEEN TWO SLAVES OF AN ANNULAR DATA NETWORK

(71) Applicant: B&R INDUSTRIAL AUTOMATION GMBH, Eggelsberg (AT)

(72) Inventors: Dietmar Bruckner, Anthering (AT); Franz Prenninger, Helpfau-Uttendorf (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 141 days.

(21) Appl. No.: 15/281,841

(22) Filed: Sep. 30, 2016

(65) Prior Publication Data

US 2017/0099213 A1 Apr. 6, 2017

(30) Foreign Application Priority Data

Oct. 1, 2015 (AT) .............................. A 50831/2015

(51) Int. Cl.
*H04L 12/707* (2013.01)
*H04L 12/423* (2006.01)
(Continued)

(52) U.S. Cl.
CPC ............ *H04L 45/22* (2013.01); *H04L 12/423* (2013.01); *H04L 12/437* (2013.01); *H04L 45/02* (2013.01); *H04L 2012/4026* (2013.01)

(58) Field of Classification Search
None
See application file for complete search history.

(56) References Cited

U.S. PATENT DOCUMENTS 3,845,472 A * 10/1974 Buchanan ................ H04Q 9/14
370/222
4,677,614 A * 6/1987 Circo .................... H04J 3/0641
370/222
(Continued)

FOREIGN PATENT DOCUMENTS

DE 19510280 A1 * 9/1995 ......... G05B 19/0421
DE 19840562 A1 * 3/2000 ........... H04L 12/437
(Continued)

OTHER PUBLICATIONS

Austria Search Report conducted in counterpart Austria Appln. No. 50831/2015 (dated Jul. 28, 2016).
(Continued)

*Primary Examiner* — Ayaz R Sheikh
*Assistant Examiner* — Tarell A Hampton
(74) *Attorney, Agent, or Firm* — Greenblum & Bernstein, P.L.C.

(57) ABSTRACT

In order to be able to maintain cross-traffic between slaves in a ring topology of an Ethernet-based data network even in the event of an error in the ring topology, which leads to the interruption of the ring topology, it is provided that in the event of the occurrence (rectification) of an error (F) in the annular data network (1), the ringmaster is configured to forward data packets or to block at least multicast data packets, and that the master prompts the slaves (S1, S2), communicating with one another via cross-traffic, to transmit configuration data packets (DPMC1, DPMC2) as multicast data packets to each of the other slaves (S1, . . . , Sn) of the annular data network in order to adjust address tables (AT1, AT2) in the slaves (S1, S2), communicating with one another via cross-traffic.

12 Claims, 3 Drawing Sheets

(51) Int. Cl.
*H04L 12/751* (2013.01)
*H04L 12/437* (2006.01)
*H04L 12/40* (2006.01)

(56) References Cited

U.S. PATENT DOCUMENTS

| | | | | |
|---|---|---|---|---|
| 5,371,766 | A * | 12/1994 | Gersbach | H04L 7/0337 327/166 |
| 5,483,535 | A * | 1/1996 | McMillen | H04L 12/433 370/452 |
| 6,430,151 | B1 * | 8/2002 | Glas | H04L 1/22 370/222 |
| 6,581,117 | B1 * | 6/2003 | Klein | G16H 40/63 710/110 |
| 2004/0008720 | A1 * | 1/2004 | Wang | H04L 12/422 370/460 |
| 2005/0111372 | A1 * | 5/2005 | Koestner | H04L 1/22 370/248 |
| 2005/0243823 | A1 | 11/2005 | Griswold et al. | |
| 2006/0136604 | A1 * | 6/2006 | Schultze | H04L 12/403 709/251 |
| 2007/0171917 | A1 * | 7/2007 | Dai | H04L 12/413 370/395.53 |
| 2007/0204068 | A1 * | 8/2007 | Oku | H04L 12/66 709/251 |
| 2008/0025207 | A1 | 1/2008 | Akahane et al. | |
| 2008/0222447 | A1 * | 9/2008 | Ram | H04L 12/42 714/2 |
| 2009/0074413 | A1 * | 3/2009 | Bannai | H04L 12/42 398/59 |
| 2009/0180425 | A1 * | 7/2009 | Watanabe | H04W 84/18 370/328 |
| 2009/0257348 | A1 * | 10/2009 | Stokes | H04L 12/42 370/228 |
| 2010/0054246 | A1 * | 3/2010 | Shah | H04L 12/1863 370/390 |
| 2010/0226260 | A1 * | 9/2010 | Zinjuvadia | H04L 41/12 370/248 |
| 2013/0064075 | A1 | 3/2013 | Pu | |
| 2013/0083647 | A1 | 4/2013 | Xie | |
| 2013/0294226 | A1 * | 11/2013 | Lim | H04L 69/40 370/225 |
| 2014/0341224 | A1 * | 11/2014 | Armbruster | H04L 12/42 370/395.53 |
| 2015/0365319 | A1 * | 12/2015 | Finn | H04L 45/28 370/221 |
| 2016/0142225 | A1 * | 5/2016 | Taniguchi | H04L 12/437 370/223 |

FOREIGN PATENT DOCUMENTS

| | | | |
|---|---|---|---|
| DE | 19904090 A1 * | 8/2000 | G16H 40/63 |
| DE | 19904894 A1 * | 8/2000 | H04L 12/423 |
| EP | 1062787 | 12/2000 | |
| EP | 1476988 | 9/2003 | |
| EP | 2 020 782 | 2/2009 | |
| EP | 2 290 882 | 3/2011 | |
| EP | 2 575 296 | 7/2012 | |
| EP | 2 560 325 | 2/2013 | |

OTHER PUBLICATIONS

Europe Search Report conducted in counterpart Europe Appln. No. EP 16 19 1487 (dated Jan. 25, 2017).

* cited by examiner

METHOD FOR CROSS-TRAFFICKING BETWEEN TWO SLAVES OF AN ANNULAR DATA NETWORK

This application claims priority under 35 U.S.C. § 119(a) of Austrian Application No. A50831/2015 filed Oct. 1, 2015, the disclosure of which is expressly incorporated by reference herein in its entirety The present invention relates to a method for data communication in the form of cross-traffic between at least two slaves of an annular data network, wherein a master is connected to a first branch of the annular data network with a number of slaves and to a second branch of the annular data network with a number of slaves, and the ends of the branches are connected to a slave provided as a ringmaster.

In a data network, a network protocol is implemented, with which data is transferred in data packets in the data network between the network nodes which are connected to the data network. Probably the best known and most widespread network protocol is the Ethernet protocol. Hereto, Ethernet defines data packets (also called data frame or Ethernet frame), in which data of a higher-level communication protocol can be transferred encapsulated in an Ethernet data packet. In doing so, data of the communication protocol can be transferred in an Ethernet data packet with a data length between 46 and 1500 bytes. Addressing in the Ethernet protocol is effected by means of MAC (Media Access Control) addresses of the network nodes which are clearly allocated for every network device. As seen from the perspective of the known OSI model, Ethernet is exclusively implemented on layers 1 and 2. In the higher layers, different communication protocols can be implemented. Hereby, a multiplicity of communication protocols has been established, for example IP in layer 3 or TCP and UDP in layer 4 to name but a few of the most widespread communication protocols.

With regard to hardware, today's Ethernet systems are so-called switched data networks, in which individual network nodes do not have to be connected with one another and do not have to be able to communicate with one another, but can instead be connected by means of coupling elements, for example network switches or network hubs. For such purpose, a coupling element has a number of network ports for the option of connecting a network participant (either a network node or a different coupling element). Such a coupling element forwards an Ethernet data packet either to all ports (hub) or to (one) specific port(s) (switch). Thus, so-called point-to-point connections are created in a switched data network, in which Ethernet data packets are forwarded from one network node to a different network node by means of a number of coupling elements.

In case of a network switch, a so-called Source Address Table (SAT) is implemented in the switch. If the network switch receives a data packet, it stores the address of the sender (MAC address in Ethernet) and the port that received the data packet. As a result, the network switch can automatically establish an allocation between addresses of network nodes and ports. This allows the network switch to specifically transmit a data packet via the port, through which, according to the source address table, a network node (or its address) can be reached in the network. This does not have to be configured because the source address table is automatically established and maintained by the network switch. Entries from this table are also automatically aged out again after a certain interval if no further frames are observed from an already known network node. Network switches with automatic source address tables are also called unmanaged network switches.

Network nodes which are used in the industrial automation often have a built-in internal S-port switch, wherein two ports are accessible from outside and the third port serves the internal interconnection. As a result, line topologies can be realized, in which a network node is connected to the next adjacent network node in the form of a line, which is advantageous in an industrial environment for reducing the cabling effort. However, it is self-evident that external network switches or external network hubs can also be used for the setup of the network topology. Basically, any network topology is possible, i.e. particularly a star topology, a line topology, a tree topology, a ring topology, etc. as well as any combination thereof. As a rule, a ring topology requires specific precautions in order to prevent the uncontrolled circulation of multiple-address data packets (multicast). For example, it is common that one network node is determined to be ringmaster, by means of which no multicast traffic is transmitted. In the IT environment, protocols of the so-called spanning tree family have become prevalent, in which the switches automatically recognize multiple paths to MAC addresses and in such case do not use any paths except for one. However, the possible switching times for these protocols in the event of a ring break are not sufficiently short for industrial applications, particularly for real-time applications.

In order to be able to also use Ethernet for industrial automation, real-time capable Ethernet protocols have already been developed because the standard Ethernet network protocol is known to not be real-time capable. Examples of known real-time capable Ethernet protocols are Modbus/TCP, Ethernet/IP, ProfiNET IRT, EtherCAT, or Ethernet POWERLINK, to name but a few. In this context, often also the terms industrial Ethernet or real-time Ethernet are used. These real-time capable Ethernet protocols are supposed to ensure data communication that is sufficiently fast and deterministic for the corresponding application. They are thus supposed to ensure that a real-time relevant data packet is transferred via the network within a predetermined interval from sender to receiver. In an industrial automation environment, real-time capability means, e.g. that a fixed interval must be observed between the acquisition of a measured value, transfer to a control unit, calculation of an actuating value in the control unit based on the measured value, and transfer of the actuating value to an actuator for executing an operation. With reference to the real-time capable Ethernet data network for transferring these data, a predetermined interval must also be ensured.

In an industrial automation environment, there is generally as least one master network node (hereinafter also called master for short) which communicates with at least one associated, but usually a plurality of associated slave network nodes (hereinafter also called slaves for short). For realizing a real-time capable Ethernet data network, the known real-time capable Ethernet network protocols have defined a predeterminable cycle time, within which the master can usually communicate with each slave. This comprises cyclically the possibility of a data packet from the master to every slave and conversely also a data packet from each slave to the associated master. The attainable and beforehand ascertainable minimal cycle time results from the sum of the run times of the data packets. Aside from the influence of the implemented communication protocol, the run times are hardware-dependent and result from bit transmission times (length, payload) of the data packets, network infrastructure (delays due to coupling elements), and the network topology. The above-mentioned limits regarding the size of the Ethernet data packets must also be taken into account. This cyclical data traffic, which is the basis of the real-time capability in the real-time capable Ethernet network protocol, is, as a rule, extended by asynchronous (non-cyclical) data packets in every transmission cycle. Such asynchronous data packets are used by the data communication, which is not subject to the real-time requirements, for example, for the configuration of the slaves or for status queries. For such asynchronous data packets, bandwidth is reserved, i.e., a specific, defined time for asynchronous data traffic is available in every transmission cycle. However, the network nodes must share this asynchronous section of a transmission cycle. The known real-time capable Ethernet protocols differ with regard to the concrete implementation of the cyclical and asynchronous data traffic.

In the industrial environment, for example, in automation engineering, often also a redundancy is required, ensuring that the underlying data network does not malfunction in case of an error, such as a cable break or a defective network node. Therefore, due to the possibility of a network redundancy, ring topologies are of particular interest in the industrial environment because every network node can basically be reached by two different paths. If the network is physically interrupted at some location, e.g. due to a cable break, disengaging of a plug connection, etc., it does not necessarily result in the failure of the entire data network or even the subnetwork "behind" the breakage. In order to be able to maintain data traffic in the network with ring topology even in the event of an error, methods which handle such errors have already become known.

There are known methods for handling errors in the network topology, e.g. the known spanning tree method or the media redundancy protocol method. However, these methods, which were not designed for industrial application and much less so for real-time capable networks, are usually much too slow and thus cannot be used in such applications. For the industrial application, methods have been developed which allow for a quick reconfiguring of the data network.

The best known international standards, which describe implementation instructions for ring topologies on the basis of Ethernet, are described in IEC 62439, such as PRP (Parallel Redundancy Protocol) or HSR (High-availability Seamless Redundancy). In both cases, there are two redundant paths between sender and receiver of a data packet, wherein the sender must be capable of transmitting two specifically marked data packets. The receiver must be capable of receiving these specifically marked data packets and select one of them for further processing. A further, similarly working approach, IEEE 802.1CB, has recently been standardized by the IEEE working group TSN. The essential difference is the fact that the two end nodes (sender and receiver) are not required to have particular capabilities because the redundant route in between is being configured in the (corresponding) switches. A switch generates the two appropriately marked data packets and forwards them from two different ports, while a different switch receives both data packets and forwards an unmarked data packet (corresponds to the original data packet). As a result, random redundant paths per data packet or per device can be defined. Common to all the above-mentioned methods is the transmitting of at least two independent data packets without reconfiguration of the network, which correspondingly consume bandwidth in highly optimized networks. Therefore, these methods have only limited applicability particularly in real-time capable data networks.

The following known methods transfer data packets only once, resulting in a more efficient use of the available bandwidth. They differ substantially with regard to the recognition of a ring break and the subsequent reconfiguration of the paths.

For example, EP 1 476 988 B1 describes a ring topology with a network node, which is designed as redundancy manager, connecting the beginning and the end of the ring. The redundancy manager prevents a forwarding of data packets, thus acting like an open switch. At regular intervals, the redundancy manager transmits test messages in both directions into the ring. If both test messages are once again received by the redundancy manager within a specific interval, an absence of errors in the physical network is assumed. If not, it can be assumed that the ring topology is interrupted and from this moment on, the redundancy manager forwards data packets (switch closed), whereby the interrupted ring topology is transformed into a functioning line topology. The functionality of the redundancy manager requires a device specifically implemented for such purpose, thus standard network devices are not applicable as redundancy manager. Apart from that, the redundancy manager must be arranged at a specific point of the ring. In addition, the network is here also burdened by the test messages, which reduces the bandwidth available for the actual data communication.

EP 1 062 787 B1 discloses a method, with which, after the occurrence of an error in the physical network with ring topology, the redundancy manager transmits a data packet to all network nodes, which indicates the error. Subsequently, all network nodes delete their source address tables, causing the network to reconfigure. Through such a reconfiguration, the network nodes learn again at which port the master can be reached, and the data communication between master and slave can thus be quickly reestablished. Due to the reconfiguration, all network nodes in the ring topology can once again be reached. With this method, all network nodes must have access to their source address table which, once again, requires specifically designed devices and thus no standard network devices can be used in the ring as well.

However, particularly in highly optimized industrial Ethernet-based data networks, often so-called cross-traffic is realized, whereby two slaves communicate directly, i.e. without the inclusion of the master, with one another, and as a result, the speed of the data communication can be increased significantly. In case of an error in the network topology (cable break, disengaging of a plug, defect network node, etc.), the cross-traffic is interrupted at the error location. The aforementioned prior art does not at all go into direct cross-traffic between two slaves and the quick reconfiguration of the cross-traffic.

Therefore, the problem addressed by the present invention is that of providing a method by means of which direct cross-traffic between slaves in a ring topology of the data network can be maintained even in the event of an error in the ring topology which leads to the interruption of the ring topology.

According to the invention, this problem is solved such that, in the event of the occurrence of an error or in case of the rectification of an error in the annular data network, the ringmaster is configured to forward or block data packets or at least multicast data packets, and the master prompts the at least two slaves, communicating with one another via cross-traffic, to transmit configuration data packets as multicast data packets to each of the other slaves of the annular data network in order to adjust address tables in the at least two slaves communicating with one another via cross-traffic.

The method according to the invention does not impose any requirements on the hardware used but builds solely on the standard functionality of a network switch. As a result, standard network components, particularly standard unmanaged network switches can be used. The address tables are thus rewritten automatically. The ringmaster is merely a function that must be activated in the control software. For implementation, the communication protocol must be defined accordingly in order to ensure that the required messages can be sent and recognized. With the method according to the invention, extremely short switching times in the range between a few 100 µs and few milliseconds can be realized in case of a ring break and as a result, the method is also usable particularly in real-time networks.

When the master transmits multicast data packets in both branches of the annular data network to all slaves present in the ring, a reconfiguration of all slaves in the data network can be achieved in a simple manner. As a result, the address tables of the slaves are automatically adjusted after the beginning or the end of the forwarding of the data packets by the ringmaster (RM), and the traffic between the slaves and the master can be maintained without further losses or necessary configuration.

An error can be easily recognized if ring status data packets are sent as multicast data packets by the master in temporal intervals in both branches of the annular data network, which are received by the ringmaster, and the ringmaster detects an error in the annular data network if the ring status data packets are received once or several times in a row from only one branch, or the ringmaster detects the rectification of an error in the annular data network if the ring status data packets are received once or several times in a row from both branches. Such a ring status data packet can be easily implemented in the communication protocol. These ring status data packets can simultaneously also be used as multicast data packets for the reconfiguration of the data communication between master and slaves.

Thereby, it is all the more advantageous if normally provided multicast data packets are used as ring status data packets in the communication protocol of the data communication. When building on normally provided and sent data packets, no additional data packets are required which reduce the bandwidth for the normal data communication.

In a simple manner, the ringmaster can inform the master about an error if the ringmaster transmits an error data packet to the master.

In the following, the present invention shall be explained in more detail with reference to FIGS. 1 to 6 which show advantageous embodiments of the invention in an exemplary, schematic, and non-restrictive manner.

In a real-time capable Ethernet network protocol, transmission cycles with predetermined cycle times are defined, in which the master can usually communicate once with every slave S1, . . . , Sn. A transmission cycle it temporally precisely divided, i.e. the points in time at which the master M or the slaves S1, . . . , Sn are allowed to transmit data packets DP are predefined. As a result, data collisions (or delays due to accumulating switch queues) at the data network 1 can be prevented. Thus, each of the network nodes involved (master M, slaves S1, . . . , Sn) knows at which time within a transmission cycle it is allowed to transmit data packets DP. Since Ethernet allows for a full-duplex data communication, it is possible that in a network section, data packets DP are transmitted simultaneously in both directions. The real-time-based data communication occurs cyclically and a temporal range is provided for this cyclical (isochronal) data traffic. Therefore, the number of network nodes, master M and slaves S1, . . . , Sn, and the size of the transmitted data is also a determining factor for the achievable cycle time. However, in every transmission cycle, a range for asynchronous data traffic is reserved. The asynchronous data traffic predominantly serves the data traffic that is not subject to a real-time requirement, and the network nodes present in the data network 1 must share the asynchronous bandwidth according to an implemented pattern.

Figure 1:
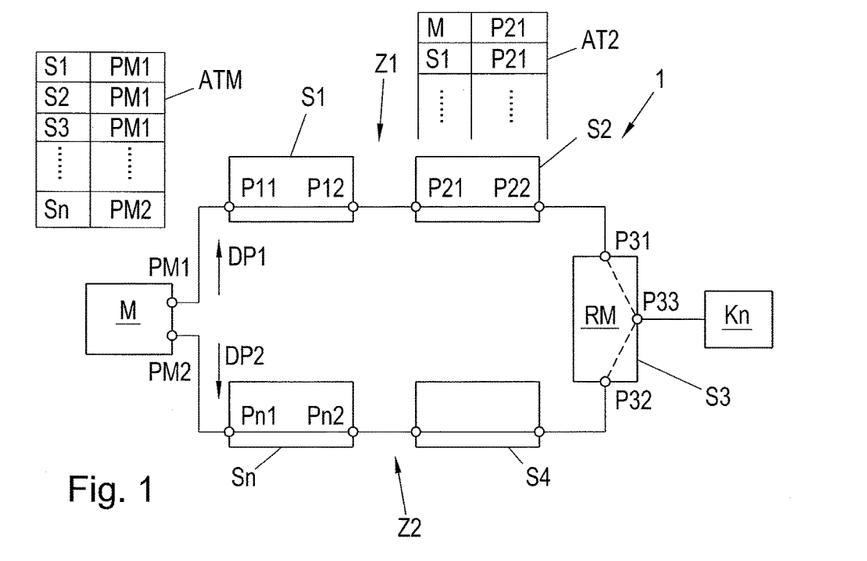
FIG. 1 shows an annular data network with master and ringmaster.

FIG. 1 shows a simplified annular data network 1. The master M is annularly connected to the slaves via the slaves S1, . . . , Sn. For that purpose, the master M is connected to the two branches Z1, Z2 of the annular data network 1 and the ends of the two branches Z1, Z2 are connected to one another via a slave S3 which is provided as ringmaster RM. In FIG. 1, the connection is each indicated by a connection between the ports P11, P12 or P21, P22, etc., of the slaves S1, . . . , Sn. Slave S3 serves as ringmaster RM which, in a flawless annular data network 1, is configured such that no data packets are transmitted from a branch Z1, Z2 to the corresponding other branch Z2, Z1. In FIG. 1, this is indicated by the unconnected ports P31, P32.

Figure 2A:
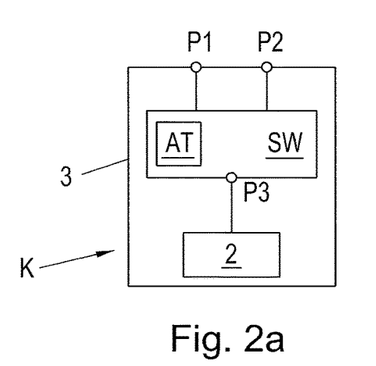
FIGS. 2a and 2b show possible embodiments of a network node with network switch.
Figure 2B:
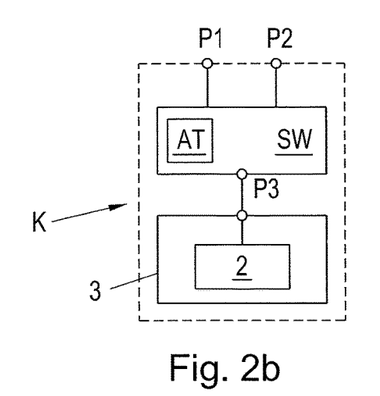

A network node K (master M or slave S) is a network device 3 with network switch SW, which can be integrated internally in the network device 3, for example as 3-port network switch as shown in FIG. 2a. It is also conceivable that a network device 3 is connected to an external network switch SW in order to form a network node K as shown in FIG. 2b. For the present invention, both realizations of a network node K are conceivable; therefore, in the following, this hardware difference will no longer be elaborated on, and instead it will be assumed that the master M and the slaves S1, . . . , Sn each are provided with a network switch SW. For an annular data network 1, the network switch SW must have at least two externally accessible ports P1, P2. Often a third port P3 of the network switch SW is connected internally with a control unit 2 of the network node K. In the network switches SW, or generally in the network node K, an address table AT is also implemented in a known manner, from which the network switch SW extracts the information as to by which of the external ports P1, P2 a different network node of the connected data network can be reached.

A network node K can also have additional external ports P33, as indicated in FIG. 1 on slave S3, to which further network nodes Kn can be connected. However, these further network nodes Kn are not considered to be part of the annular data network 1. Such a further external port P33, however, can be reachable from both branches Z1, Z2, indicated by the dotted connection in FIG. 1, which does not close the ring.

In the course of the data communication on the annular data network 1, often so-called multicast data packets are also transmitted, whereby a network node (master M, slaves S1, . . . , Sn) transmits a data packet to a plurality of other network nodes in the annular data network 1. Such a multicast data packet is received at a port of the network node and retransmitted on the other port or other ports. In order to prevent the uncontrolled circulation of such multicast data packets in the annular data network 1, the ringmaster RM, in case of an intact annular data network 1, is configured such that it at least does not forward multicast data packets. Preferably, the ringmaster RM, in case of an intact annular data network 1, is configured such that it does forward no data packets at all, including unicast data packets.

Within the framework of the data communication at an intact annular data network 1, the master M transmits, for example, data packets DP1, DP2 into both branches Z1, Z2 of the data network 1 in ring topology. The data packets DP1, DP2 are either transmitted to exactly one of the slaves S1, ..., Sn (unicast traffic) or to a plurality of or even all slaves S1, ..., Sn, or to a plurality of or even all slaves S1, ..., Sn of a branch Z1, Z2 (multicast traffic). In multicast traffic, the data packets DP1 and DP2 can also be identical. Corresponding to the implemented communication protocol, the slaves S1, ..., Sn transmit data packets back to the master M in accordance with the communication protocol.

As ringmaster RM, a slave is selected ideally in the center of the ring, i.e. a slave that in both branches Z1, Z2 is approximately at equal distance from the master M in order to achieve approximately the same transmission times in both branches Z1, Z2.

Figure 3:
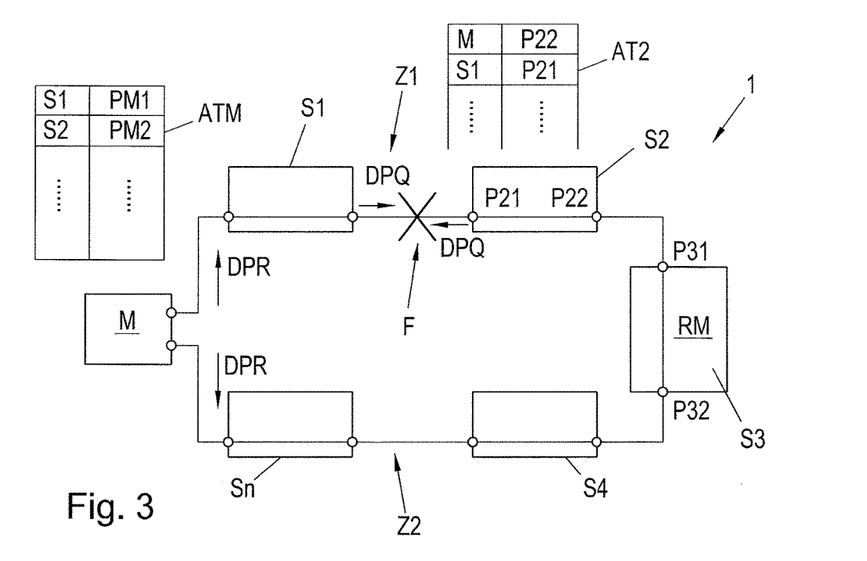
FIG. 3 shows the annular data network with error.

In the event of an error F, as shown in FIG. 3, the annular data network 1 is interrupted at the error location. An error F can be detected by the ringmaster RM if the master M transmits at regular intervals a specific ring status data packet DPR as multicast data packet to all slaves S1, ..., Sn. The ringmaster RM can thus recognize whether the arrival of such a ring status data packet DPR at one of its ports P31, P32 does not occur and, in such case, can extrapolate that there is an error F in one of the corresponding branches Z1, Z2. Of course, in the ringmaster RM, it is possible to configure how often the successive non-occurrence of the ring status data packet DPR must be detected before an error in the annular data network 1 is assumed to have occurred. In error-prone data networks 1, for example with error-prone transmission lines such as slip rings, WLAN lines, etc., a higher value is preferably set.

In order to avoid additional burden on the data communication through the transmission of the ring status data packets DPR, it is possible use data packets already provided in the communication protocol for such purpose. For example, the communication protocol can contain multicast data packets from the master M to the slaves S1, ..., Sn that are transmitted in specific or all transmission cycles, preferably in the cyclical part of the transmission cycle. The ringmaster RM can thus expect the arrival of these multicast data packets and assume an error F in branch Z1, Z2, from which no data packet is received. The use of such multicast data packets from the master M as ring status data packets DPR is further advantageous because, in case of an error detection, the connection in the ringmaster RM that was open thus far can be immediately closed; as a result, the multicast data packets of the master can be forwarded via the ringmaster RM. The address tables of the slaves connected behind the ringmaster RM (to the master) without requiring further measures.

Such multicast data packets from the master M to the slaves S1, ..., Sn usually also contain data from the master M to the slaves S1, ..., Sn. This simultaneously ensures that the data reach all slaves S1, ..., Sn even in the event of a ring break and that all slaves S1, ..., Sn receive their data in the same transmission cycle, in which the switch occurs. Data loss and delay due to retransmitting of the data can thus be prevented.

Of course, the method for detecting an error F can also be reversed. In this case, the ringmaster RM can be configured to transmit at regular intervals a ring status data packet DPR via both branches Z1, Z2 to the master M. In the event that no ring status data packet DPR is received x times, the master M can once again extrapolate that there is an error F in the corresponding branch Z1, Z2.

However, the master M can also detect an error without a separate ring status data packet DPR. For such purpose, the master M can again use the data packets already provided in the communication protocol. For example, if one or each slave S1, ..., Sn transmits a data packet to the master M in every transmission cycle, the master M can deduce an error F if said data packets are not received. If the master M usually receives a data packet from each slave S1, ..., Sn, the master can deduce an exact error location even on the basis of the missing data packets, provided that the master M knows the topology of the data network 1 (which is usually the case).

Here it must be noted that on the physical layer of a network device often there is a link detection is implemented as well, as is the case, for example, with Ethernet. However, this link detection is not reliable enough because it is possible that a lost link (e.g. due to a core breakage in the network cable) is not detected. Apart from that, this link detection would also not be sufficiently quick because, for example, with Ethernet a pulse is transmitted every 16 ms and the pulse would have to fail several times in a row at the receiver side for the link detection to respond.

Once the ringmaster RM or the master M has detected an error F in the data network 1 in this or any other suitable way, the connection between the ports P31, 32 of the ringmaster RM is closed (FIG. 3), thus making data communication (both as unicast and multicast) via the ringmaster RM possible. Simultaneously, a method for reconfiguring the data network 1 is initiated, e.g. similar to the initially described prior art.

When the master M transmits multicast data packets to the slaves S1, ..., Sn for reconfiguration, reconfiguration is effected automatically by the standard Ethernet functionality without the requirement of a specific method for reconfiguration or imposing specific hardware requirements on the slaves S1, ..., Sn. Such multicast data packets can be transmitted in intervals or only once. For example, the ring status data packets DPR can also be used for such purpose.

Due to the reconfiguration (regardless of the method used), each slave S1, ..., Sn can again be reached by the master M and each slave S1, ..., Sn can reach the master M. Within the course of this reconfiguration, the address tables AT1, ..., ATn of the slaves S1, ..., Sn and the address table ATM of the master M are reconfigured correspondingly, which shall be explained with the example of the address table ATM of the master M.

FIG. 1 shows the address table ATM of the master M, which shows which port PM1, PM2 of the master M is required to reach each slave S1, ..., Sn of the annular data network 1. In the course of the reconfiguration in the event of an error F, the address table ATM of the master M is rewritten, and so the address table ATM now contains that the slave S2 can no longer be reached via the port PM1 but instead via the port PM2 (FIG. 3). The address tables AT1, ..., ATn of the slaves S1, ..., Sn are rewritten in the same manner by the reconfiguration. For example, slave S2 no longer transmits data packets DP to the master M via the port P21 but instead via the port P22. In this manner, the normal data traffic between master M and slaves S1, . . . , Sn can be quickly reorganized. For this purpose, any method for the reconfiguration of the data communication between master M and the slaves S1, . . . , Sn is applicable.

However, in the annular data network 1, a direct cross-traffic between slaves S1, . . . , Sn can also be implemented. Cross-traffic in this context means that two slaves communicate with one another via the data network 1 without the inclusion of the master M by exchanging cross-traffic data packets DPQ among one another. For example, it can be provided that the slaves S1, S2 exchange cross-traffic data packets DPQ without the inclusion of the master M, as indicated in FIG. 3. The slaves S1, . . . , Sn which communicate directly with one another do not have to be adjacent to one another; instead, the cross-traffic could also be implemented across a plurality of slaves S1, . . . , Sn. The cross-traffic is also configured by appropriate entries in the address tables AT of the slaves S1, S2 involved in the cross-traffic, as indicated in the address tables AT2 of slave S2.

This cross-traffic allows the slaves involved to directly communicate with one another within a transmission cycle and independently from the remaining data communication (except for avoiding collisions or possible delays due to switch queues at the data network) by means of exchanging data packets. This allows for very quick reactions of a slave S1, S2 involved in the cross-traffic, which is particularly interesting in highly dynamic, synchronized controls of machines. For example, direct cross-traffic between a sensor (for example, a rotation sensor) and a motor control of an electric motor can be provided in a drive control which would allow for the drive to be operated with a very short scanning time (corresponds to the time of a transmission cycle). If communication via the master were necessary, then the possible scanning time would be correspondingly longer due to the longer communication paths.

However, with the reconfiguration of the data network 1 in the course of an error F as described above, said cross-traffic would be interrupted at the error location.

If, due to the reconfiguration, only those parts of the address tables AT1, . . . , ATn of the slaves S1, . . . , Sn are rewritten which relate to the data traffic with the master M, entries in the address tables AT1, . . . , ATn remain which would prevent a cross-traffic. For example, if the entry that slave S1 can be reached by slave S2 via port P21 remains in the address table (as in FIG. 3), slave S2 would unsuccessfully attempt to transmit cross-traffic data packets DPQ via this port P21 to slave S1 because the error F is present between the slaves S1, S2. The same can occur if, in the course of the reconfiguration, the entire address tables AT1, . . . , ATn are deleted, thus also deleting the entries for the direct cross-traffic. However, these entries required for the cross-traffic are not rewritten by the reconfiguration according to the prior art, which would also prevent the direct cross-traffic via the error location.

Figure 4:
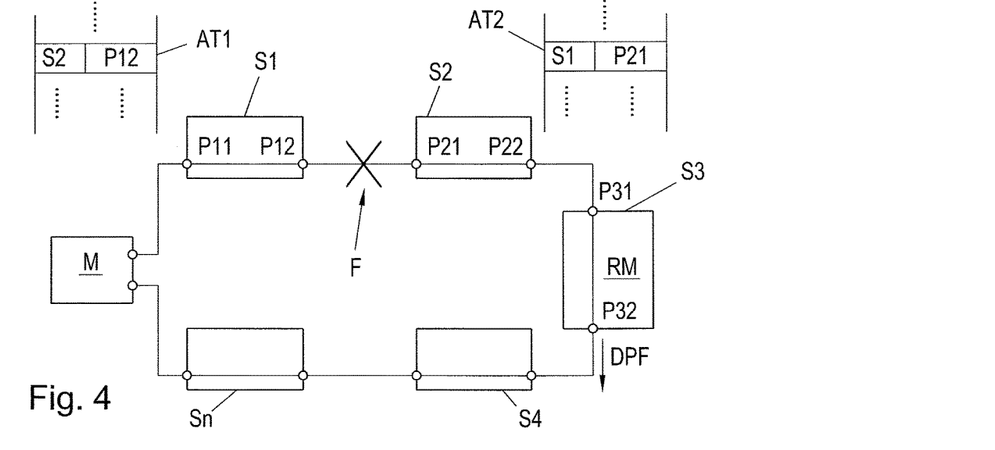
FIG. 4 shows the notification of the master in the event of an error in the annular data network.

In order to circumvent this problem, it is provided, according to the invention, that, in the event of a detection of an error F in the annular data network 1 via the intact branch Z2 of the annular data network 1, the ringmaster RM transmits an error data packet DPF to the master M (FIG. 4) in order to inform the master M about the error F. If the error F is detected in the master M, the master M can transmit the error data packet DPF to the ringmaster RM, making it possible for the ringmaster RM to close the data communication connection via its ports P31, P32, as described above. The bandwidth for the error data packet DPF can be fixedly implemented in the transmission cycle, preferably in the isochronal part of the transmission cycle in order to be able to release the notification as soon as possible without the wait for a free transmission slot.

However, in principle, the method according to the invention for reconfiguring the direct cross-traffic between two slaves S1, . . . , Sn is independent from the manner in which an error F is detected in the annular data network 1.

Figure 5:
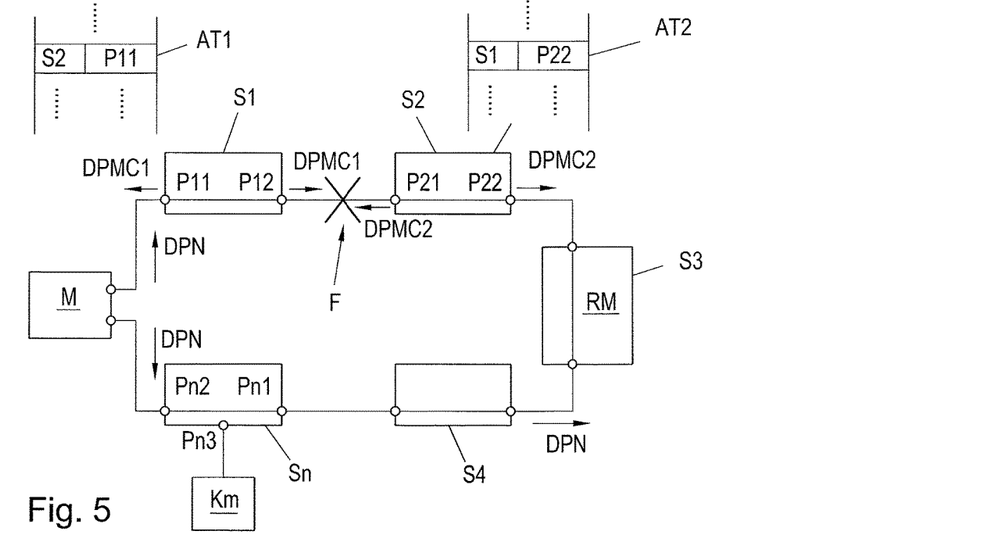
FIG. 5 shows the reconfiguration of the cross-traffic through the transmitting of cross-traffic data packets.

Once an error F is detected in the annular data network 1 and the master M is informed about such detection, the master M transmits a start data packet DPN to all slaves S1, . . . , Sn (FIG. 5), with which all slaves S1, . . . , Sn of the annular data network 1 are prompted to transmit a configuration data packet DPMC in the form of a multicast data packet to each of the other slaves S1, . . . , Sn (FIG. 5). This means that each slave S1, . . . , Sn transmits the configuration data packet DPMC via all ports P that are integrated in the annular data network 1. For example, slave S2 transmits its configuration data packet DPMC2 via the ports P21, P22. On a slave S1, . . . , Sn, additional ports P not integrated in the annular data network 1 can be provided, to which the other network nodes Km are connected. The slave Sn in FIG. 5, for example, has an additional external port Pn3, to which a further network node Km is connected. For the method according to the invention, it is not required that a configuration data packet DPMCn is also transmitted via such ports P which are not integrated in the annular data network 1.

If the master M is aware of the configuration of the cross-traffic, i.e., if the master M knows which of the slaves S1, . . . , Sn are configured for cross-traffic among one another, it also suffices if the master transmits the start data packet DPN only to the slaves S1, . . . , Sn which participate in the cross-traffic. Thus, only the slaves S1, . . . , Sn which participate in the cross-traffic would transmit such a configuration data packet DPMC.

In order to make configuration data packets DPMC in the form of multicast data packets possible, the ringmaster RM, in the event of an error, must forward multicast data packets from slaves S1, . . . , Sn. Therefore, in case of an error, the ringmaster RM must remove the restriction required for the intact ring. However, the error F (ring break) ensures that these multicast data packets DPMC cannot circulate uncontrolledly. The slave S1 thus receives the configuration data packet DPMC2 of the slave S2 via port P11 (FIG. 5). By means of the standard mechanisms of an unmanaged network switch, the address table AT1 in the slave S1 is automatically rewritten if the slave S1 receives a data packet of another slave S2 via another port P11 which is different from the one recorded in the address table AT1. Due to said automatic rewriting of the address table AT1, slave S1 knows that slave S2 can no longer be reached via port P12 but instead via port P11. Due to the configuration data packet DPMC1 of slave S1, the address table of slave S2 is rewritten in the same manner, and so slave S2 also knows the slave S1 can be reached via port P22. Thus, the cross-traffic via the error location F can be circumvented and the cross-traffic between the slaves S1, S2 takes place via the intact connections of the annular data network 1. As a rule, no interference with the functionality of the network switch of the slaves S1, . . . , Sn is hereto required because said rewriting of the address tables AT is a standard function of a network switch. The rewriting of the address tables AT and thus also the reconfiguration of the cross-traffic is effected automatically.

If the error F is rectified, the procedure is similar. For example, the ringmaster RM or the master M recognizes for example that ring status data packets DPR once again arrive from both branches Z1, Z2, which is only possible if the error location has been rectified. The ringmaster RM informs the master M (or vice versa) that the error F has been rectified, for example, once again by an error data packet DPF. Upon recognizing the rectification of the error F, the ringmaster RM again prevents at least the forwarding of multicast data packets of the slaves S1, . . . , Sn in order to prevent an uncontrolled circulation of such data packets in the ring. Preferably, the ringmaster RM prevents the forwarding of all data packets. Via a start data packet DPN, the master M again prompts all slaves S1, . . . , Sn, or advantageously all slaves S1, S2 participating in the cross-traffic, to transmit a configuration data packet DPMC to every other slave S1, . . . , Sn. These configuration data packets DPMC as multicasts are not forwarded by the ringmaster RM. As a result, in the example according to FIG. 5, the configuration data packet DPMC2, at corrected error F, would arrive at slave S1 via port P12 which would result in the rewriting of address table AT1. The same would apply to address table AT2 of slave S2 which would be rewritten due to a configuration data packet DPMC1 of slave S1. The cross-traffic between slave S1 and slave S2 would again be effected along the shorter path via the ports P12 and P21.

The start data packet DPN is preferably transmitted as multicast data packet; i.e. a slave S1, . . . , Sn receives the start data packet DPN at a port and forwards it via this or the other port(s). Alternatively, the master M could also transmit individual start data packets DPN to slaves S1, . . . , Sn, which would utilize more bandwidth of the data communication.

With an intact ring R, i.e. without error F, it is also possible to eliminate cross-traffic via the ringmaster RM. The reason lies in the fact that such cross-traffic, e.g. between slaves S2 and S4, could be configured but not maintained. The configuration can be effected by means of a configuration tool when setting up the data network 1. However, the ringmaster RM could also fake cross-traffic in the form of data packets in order to rewrite the address tables AT2, AT4 of the slaves S2, S4 correspondingly. But the configuration of cross-traffic via the ringmaster RM can only be maintained until one of the slaves S2, S4 involved transmits multicast data packets, which may occur frequently. Since the ringmaster RM blocks such multicast data packets in the intact ring R, the multicast data packet would reach the other slave via the long path, resulting again in a rewriting of the address tables AT2, AT4. Therefore, it is meaningful to completely eliminate cross-traffic via the ringmaster RM.

The normal data communication (i.e., not the direct cross-traffic between S1, . . . , Sn) after correction the error could again be reconfigured with conventional methods. However, for the reconfiguration, the master M again could transmit multicast data packets to the slaves S1, . . . , Sn, resulting in the automatic reconfiguration by the standard Ethernet functionality without the requirement of a specific method for reconfiguration or imposing specific hardware requirements on the slaves S1, . . . , Sn. Such multicast configuration data packets can be transmitted in intervals or only once. For example, the ring status data packets DPR can also be used for such purpose.

Figure 6:
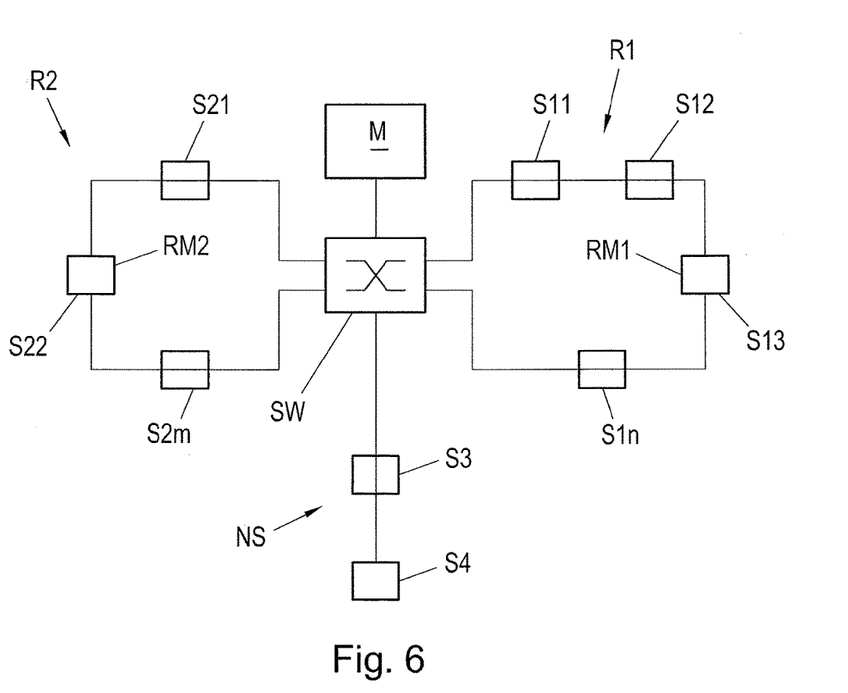
FIG. 6 shows a network topology with network switch with a master and a plurality of annular data networks connected to said network switch.

Of course, the master M could also be integrated in the ring topology by means of an external network switch SW, as described in FIG. 6. In this case, a network switch SW is provided which is connected to the master M. A first ring R1 in the form of an annular data network 1 with a number of slaves S11, . . . , S1n and a second ring R2 in the form of an annular data network 1 with a number of slaves S21, . . . , S2m is connected to the network switch SW. In addition, other network segments NS can also be connected to the network switch SW, for example, a linear network segment with two slaves S3, S4 as in FIG. 5. In this manner, even a plurality of annular data networks 1 can be operated with a master M. However, the basic method of handling an error F remains unchanged, and each of the rings R1, . . . requires a slave with ringmaster function.

It is also conceivable that the function of the ringmaster RM is assumed by the master M. In such case, the error data packet DPF would not be transmitted via the annular data network 1 but internally signaled by the master M. This does not change the basic procedure of reconfiguring the cross-traffic.

Furthermore, it must be emphasized again that the method for reconfiguring the cross-traffic according to the invention is independent from the method for reconfiguring the data traffic between master M and the slaves S1, . . . , Sn.

The configuration data packets DPMC of the slaves S1, . . . , Sn for reconfiguring the cross-traffic are preferably, but not necessarily realized as a synchronous data traffic. It is thus possible to complete the reconfiguration within a few transmission cycles, ideally within one transmission cycle, which allows for a particularly quick switchover of the cross-traffic. Hereby, a slave S1, . . . , Sn would receive the start data packet DPN in one transmission cycle and transmit the configuration data packets DPMC in the asynchronous range in the same transmission cycle. In this case, it is particularly ensured that the cross-traffic is reorganized before the next transmission cycle begins, whereby data loss due to data packets lost at the error location F can be prevented, which is particularly important in a real-time capable data network.

If the ring status data packet DPR is transmitted as multicast data packet in the isochronal part of the transmission cycle (and thus temporally precisely planned) and a threshold value is set as to how many data packets must be lost before a switch is effected, then it is possible, in connection with the knowledge as to how long the transmitting of the error data packet DPF and the configuration data packets DPMC lasts, to make a precise estimation as to how long it takes until the ring, in case of an error, is active again without data packet loss.

However, the predetermined cycle time also influences the maximum size of the ring R. In case of an error, the cross-traffic via the error location cannot be maintained but must be routed around such error location, resulting in longer travel times of the data packets of the cross-traffic. Therefore, the number of network nodes in the ring multiplied by the corresponding latency period of the network nodes (i.e., the time that a network node requires to transmit a data packet, which arrives at a first port, to a second port) must be less than the cycle time. If this requirement is not met, the cross-traffic cannot be maintained in case of an error because it might not be possible to conclude the cross-traffic within the cycle time.

A further limitation with regard to the permissible size of the ring R may arise if the reconfiguration is to be completed within a transmission cycle. Within a transmission cycle, a master M can transmit a start data packet DPN only to a specific number of slaves S1, . . . , Sn. Furthermore, only a specific number of slaves S1, . . . , Sn can transmit their configuration data packets DPMC within the transmission cycle in the asynchronous range of the transmission cycle.

Both limit the possible number of network nodes in the ring R if the cross-traffic is to be switched particularly fast, i.e. within a transmission cycle.

The invention claimed is:

1. Method for data communication in a form of cross-traffic between at least two slaves of an annular data network, wherein a master is connected to a first branch of the annular data network with a number with a first plurality of slaves and to a second branch of the annular data network with a second plurality of slaves, and wherein a slave is arranged at an end of the first branch and at an end of the second branch as a ringmaster, wherein, in an event of an error in the annular data network, the method comprises:
    configuring the ringmaster to forward data packets; and
    prompting, via the master, the at least two slaves, communicating with one another via cross-traffic to transmit configuration data packets as multicast data packets to each of the other slaves of the annular data network in order to adjust address tables in the at least two slaves communicating with one another via cross-traffic.

2. Method for data communication in a form of cross-traffic between at least two slaves of an annular data network, wherein a master is connected to a first branch of the annular data network with a first plurality of slaves and to a second branch of the annular data network with a second plurality of slaves, and wherein a slave is arranged at an end of the first branch and at an end of the second branch as a ringmaster, wherein, in an event of a rectification of an error in the annular data network, the method comprises:
    configuring the ringmaster to block at least multicast data packets; and
    prompting, via the master, the at least two slaves communicating with one another via cross-traffic to transmit configuration data packets as multicast data packets to each of the other slaves of the annular data network in order to adjust address tables in the at least two slaves communicating with one another via cross-traffic.

3. Method according to claim 1, wherein the master transmits multicast data packets in both branches of the annular data network to all slaves in the annular data network.

4. Method according to claim 1, further comprising:
    transmitting, as multicast data packets by the master, ring status data packets in intervals in the first and second branches of the annular data network;
    receiving the ring status data packets by the ringmaster; and
    detecting, in the ringmaster, the error in the annular data network when the ring status data packets are received once or several times in a row from only one branch.

5. Method according to claim 4, wherein multicast data packets, provided in a communication protocol of the data communication, are used as ring status data packets.

6. Method according to claim 4, wherein the ringmaster transmits an error data packet to the master in order to inform the master about the occurrence of the error.

7. Method according to claim 1, wherein the master -transmits a start data packet in order to prompt the at least two slaves communicating with one another via cross-traffic to transmit the configuration data packets.

8. Method according to claim 2, wherein the master transmits multicast data packets in the first and second branches of the annular data network to all slaves in the annular data network.

9. Method according to claim 2, further comprising:
    transmitting as multicast data packets by the master, ring status data packets in intervals in the first and second branches of the annular data network;
    receiving the ring status data packets by the ringmaster; and
    detecting, in the ringmaster, the rectification of the error in the annular data network when the ring status data packets are received once or several times in a row from the first and second branches.

10. Method according to claim 9, wherein multicast data packets, provided in the communication protocol of the data communication, are used as ring status data packets.

11. Method according to claim 9, wherein the ringmaster transmits an error data packet to the master in order to inform the master about an occurrence of the error.

12. Method according to claim 2, wherein the master transmits a start data packet in order to prompt the at least two slaves communicating with one another via cross-traffic to transmit the configuration data packets.

* * * * *